United States Patent Office 2,982,776
Patented May 2, 1961

2,982,776

16α-METHYLPREGNANE DERIVATIVES AND PROCESSES FOR PREPARING THE SAME

Earl M. Chamberlin, Westfield, John M. Chemerda, Metuchen, Jan Ten Broeke, Rahway, and Edward W. Tristram, Cranford, N.J., assignors to Merck & Co. Inc., Rahway, N.J., a corporation of New Jersey No Drawing. Filed Nov. 13, 1957, Ser. No. 696,030

6 Claims. (Cl. 260—397.45)

This invention relates to the preparation of 3α,21-diacyl - 11α - alkyl - 11β,17α - dihydroxy - pregnan - 20-one. It is also concerned with the preparation of novel chemical compounds produced as intermediates in the synthesis of 3α,21-diacyl-16α-alkyl-11β,17α-dihydroxy-pregnan-20-one.

The new chemical compounds with which this invention is concerned, 3α,21-diacyl-16α-alkyl-11β,17α-dihydroxy-pregnan-20-one can be readily converted to 16α-alkyl - 17α,21 - dihydroxy - 4 - pregnene - 3,11,20 - trione and 16α -alkyl - 11β,17α,21 - trihydroxy - 4 - pregnene-3,20-dione compounds which possess marked and enhanced anti-arthritic properties when compared with the physiologically active cortical hormones 17α,21-dihydroxy - 4 - pregnene - 3,11,20 - trione - 11β,17α,21 - trihydroxy-4-pregnene-3,20-dione.

In preparing the novel chemical compounds of the present invention, we utilize as the starting material 3α-acyloxy-16α-alkylpregnane-11,20-dione which has the following structural formula—

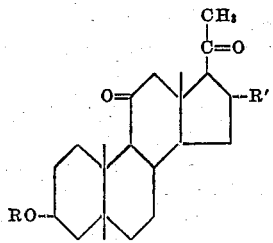

wherein R is an acyl group and R' is an alkyl group.

This starting material, namely, 3α-acyloxy-16α-alkyl-pregnane-11,20-dione, is prepared by reacting 3-acyloxy-16-pregnene-11,20-dione with methyl magnesium bromide or methyl magnesium iodide in the presence of cuprous chloride thereby forming 3α-acyloxy-16α-alkylpregnane-11,20-dione.

The starting material of this invention, 3α-acyloxy-16α-alkylpregnane - 11,20 - dione, is then halogenated with bromine or chlorine to form 3α-acyloxy-16α-alkyl-17α,21-dihalo-pregnane-11,20-dione which may be identified by the following formula—

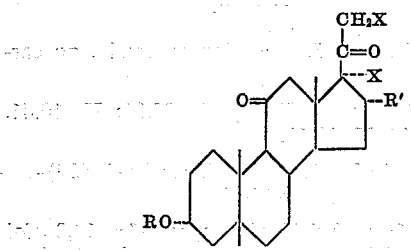

wherein R and R' are as above and X is bromine or chlorine.

The 3α - acyloxy - 16α - alkyl - 17α,21 - dihalo - pregnane-11,20-dione prepared as described above is reacted with alcoholic alkali metal hydroxide to form 16α-alkyl-3α-hydroxy-11-oxo-17(20)-pregnen-21-oic acid having the following structural formula—

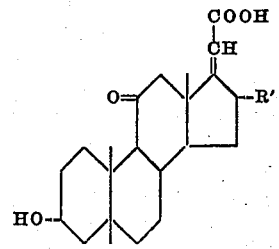

wherein R' is as above.

The 16α - alkyl - 3α - hydroxy - 11 - oxo - 17(20)-pregnen-21-oic acid thus formed is reacted with an esterifying agent such as diazomethane to form 16α-alkyl-3α-hydroxy-11-oxo-17(20)-pregnen-21-oic acid alkyl ester which may be identified by the structural formula—

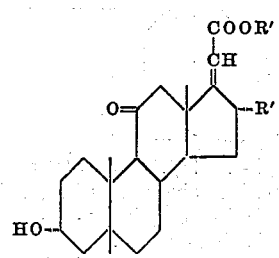

wherein R' is as above.

The 16α-alkyl - 3α - hydroxy - 11 - oxo - 17(20)-pregnen-21-oic acid alkyl ester thus obtained is reduced with lithium aluminum hydride to form 16α-alkyl-17(20)-pregnen-3α,11β,21-triol, which may be represented by the following structural formula—

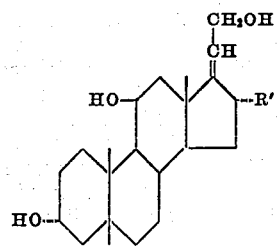

wherein R' is as above.

Acylation of the latter compound, namely, 16α-alkyl-17(20)-pregnen-3α,11β-21-triol results in the formation of 3α,21 - diacyloxy - 16α - alkyl - 17(20) - pregnen - 11 - ol which may be identified by the following structural formula—

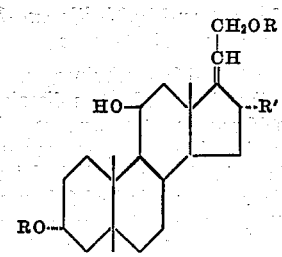

Hydroxylation of the 3α,21-diacyloxy-16α-alkyl-17(20)-pregnen-11-ol with osmium tetroxide under oxidizing conditions results in the formation of 16α-alkyl-3α,11β, 17α-21-tetrahydroxy-pregnan-20-one which has the structural formula—

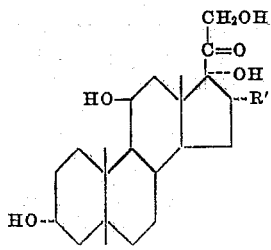

wherein R' is as above.

Acetylation of the above 16α-alkyl-3α,11β,17α,21-tetrahydroxy-pregnan-20-one yields 3α,21-diacyloxy-16α-alkyl-11β,17α-dihydroxy-pregnan-20-one which may be identified by the following formula—

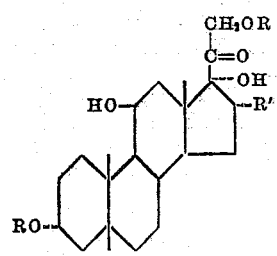

wherein R and R' are as above.

The 16α - alkyl - 3α,11β,17α,21 - tetrahydroxy - pregnan-20-one prepared as above may be readily converted to 16α - alkyl - 17α,21 - dihydroxy - 4 - pregnene - 3,11,20-trione in the following manner.

The 16α-alkyl-3α,11β,17α,21-tetrahydroxypregnane-20-one is reacted with N-bromo-acetamide to form 16α-alkyl-17α,21-dihydroxypregnane-3,11,20-trione. Acetylation of the latter compound with acetic anhydride in pyridine results in the formation of 16α-alkyl-17α,21-dihydroxy-pregnane-3,11,20-trione 21-acetate. The latter compound is reacted with bromine in glacial acetic acid-chloroform to produce 16α-alkyl-4-bromo-17α,21-dihydroxy-pregnan-3,11,20-trione 21-acetate which is then reacted with semicarbazide to form 16α-alkyl-17α,21-dihydroxy-4-pregnen-3,11,20-trione 3,20-bis-semicarbazone is reacted with potassium bicarbonate or potassium hydroxide in aqueous methanol to form 16α-alkyl-17α,21-dihydroxy-4-pregnene-3,11,20-trione 3,20-bis-semicarbazone which is then hydrolyzed under acid conditions to produce 16α-alkyl-17α, 21 dihydroxy-4-pregnene-3,11,20-trione; this compound is esterified to produce the corresponding 21-ester derivatives The following experimental part illustrates in detail some of the compounds which constitute this invention and methods for their production. However, the invention is not to be construed as limited thereby in spirit or in scope since it will be apparent to those skilled in the art that many modifications in materials and methods may be made without departing from the invention.

*Preparation of 3α-acetoxy-17α,21-dibromo-16α-methyl-pregnane-11,20-dione*

3.46 g. of 3α-acetoxy-16α-methylpregnane-11,20-dione (prepared as described hereinafter) is dissolved in 20 ml. of glacial acetic acid at room temperature. A solution of 1 ml. of glacial acetic acid at room temperature. A solution of 1 ml. of bromine in 5 ml. of glacial acetic acid is added with stirring over a period of 2 hours. The reaction mixture is allowed to stand at room temperature for 2 hours and is then poured into 300 ml. of ice water. After refrigerating overnight, the product which separated from solution is filtered and washed to neutrality with water. The crude product, namely 3α-acetoxy-17α,21-dibromo-16α-methylpregnane-11,20-dione, is recrystallized by dissolving in methylene chloride and adding methanol. M.P. 227° C. (decompose).

Analysis calculated for $C_{24}H_{34}O_4Br_2$—Br, 29.26. Found: Br, 29.21.

The 3α-acetoxy-16α-methylpregnane-11,20-dione employed as a starting material in this example may be prepared by reacting 3α-acetoxy-16-pregnene-11,20-dione with methyl magnesium iodide in the presence of cuprous chloride.

*Preparation of 3α-hydroxy-16α-methyl-11-oxo-17(20)-pregnen-21-oic acid*

3.0 g. of 3α-acetoxy-17α,21-dibromo-16α-methylpregnan-11,20-dione is dissolved in 20 ml. of ethanol and refluxed for 1 hour with a solution of 12 g. of potassium hydroxide in 20 ml. of water. The cooled, two phase reaction mixture is poured into 200 ml. of water and extracted with 3×100 ml. of ether. The ethereal extract is washed with water and dried with sodium sulfate. The ether is evaporated to a volume of approximately 20 ml. Upon cooling, 3α-hydroxy-16α-methyl-11-oxo-17(20)-pregnen-21-oic acid crystallizes from solution. After refrigeration, the product is filtered and washed with a little ether; 0.89 g. (44%); M.P. 215–223°;

$\lambda_{max.}^{CH_3OH}$ 2230 m$\mu$ $E_{1 cm}^{1\%}$ 270

*Preparation of methyl 3α-hydroxy-16α-methyl-11-oxo-17(20)-pregnen-21-oate*

0.83 g. of 3α-hydroxy-16α-methyl-11-oxo-17(20)-pregnen-21-oic acid is suspended in 200 ml. of ether and stirred overnight with excess diazomethane. The ether is removed in vacuo and the residue is dissolved in a mixture of hot n-hexane and acetone. On standing, methyl 3α - hydroxy - 16α - methyl - 11 oxo - 17(20) - pregnen-21-oate crystallizes from solution; 0.5 g.; M.P. 80–90° C.;

$\lambda_{max.}^{CH_3OH}$ 2240, m$\mu$ $E_{1 cm}^{1\%}$ 305

I.R. spectrum, 2.8–3.0 $\mu$ (OH); 5.87 $\mu$ (carbonyl); 6.06 $\mu$ (double bond).

*Preparation of 16α-methyl-17(20)-pregnene-3α,11β,21-triol*

A solution of 7.4 g. of methyl 3α-hydroxy-16α-methyl-11-oxo-17(20)-pregnen-21-oate, in 500 ml. anhydrous ether is added under nitrogen to a stirred suspension of 3.5 g. of commercial lithium aluminum hydride in 200 ml. of anhydrous ether. The reaction mixture is stirred for 19 hours and the excess lithium aluminum hydride is decomposed by the addition of 500 ml. of ether saturated with water. An additional 100 ml. of water and 100 ml. of 2.5 N hydrochloric acid is added. The aqueous layer is removed and the ether layer washed with water and dried with sodium sulfate. Evaporation of the ether leaves a crystalline residue of 16α-methyl-17(20)-pregnene-3α,11β,21-triol; 6.86 g.; M.P. 153–163. A sample recrystallized from ether, petroleum ether melted 161–164° C.

$\lambda_{max.}^{MeOH}$ no max.

I.R. 3.02 $\mu$ (hydroxyl), 5.98 $\mu$ (double bond), no carbonyl.

Analysis calculated for $C_{22}H_{36}O_3$—C, 75.81; H, 10.41. Found: C, 76.14; H, 10.60.

*Preparation of 3α,21-diacetoxy-16α-methyl-17(20)-pregnen-11-ol*

6.8 g. of 16α-methyl-17(20)-pregnene-3α,11β,2-triol is acetylated overnight at room temperature in 18 ml. of dry pyridine and 9 ml. of acetic anhydride. The excess acetic anhydride is destroyed by the addition of 5 ml. of water. The reaction mixture is poured into 100 ml. of water and extracted with ether. The ether is washed with 1 N hydrochloric acid followed by dilute potassium carbonate. The dried ethereal solution (sodium carbonate) is evaporated to give 3α,21-diacetoxy-16α-methyl-17(20)-pregnen-11-ol as a solid glass.

*Preparation of 3α,21-diacetoxy-11β,17α-dihydroxy-16α-methyl-pregnan-20-one*

A solution of 6.85 g. of 3α,21-diacetoxy-16α-methyl-17(20)-pregnen-11-ol dissolved in 200 ml. of tertiary butyl alcohol (water content 0.03%) containing 3 ml. of dry pyridine is reacted for approximately 45 hours with 191 mg. of osmium tetroxide (19.1 ml. of a 1% solution in anhydrous tertiary butyl alcohol) and 1.3 g. of hydrogen peroxide (16.5 ml. of a 2.31 M solution in anhydrous tertiary butyl alcohol). At the end of the reaction period a solution of 4.2 g. of sodium sulfite in 190 ml. of water is added and the mixture stirred 30 minutes. The tertiary butanol is removed in vacuo and the residue extracted with methylene chloride. The dried methylene chloride extract on evaporation gave 5.53 g. of amorphous product 3α,11β,17α,21-tetrahydroxy-16α-methyl-pregnan-20-one which is reacetylated at room temperature, overnight, with 25 ml. of dry pyridine and 10 ml. of acetic anhydride. The reagents are removed in vacuo and the residue dissolved in ether. The ether solution is washed with 1.25 N hydrochloric acid, water and saturated sodium bicarbonate solution. The dried (magnesium sulfate) ethereal solution on evaporation affords 5.0 g. of crude 3α,21-diacetoxy-11β,17α-dihydroxy-16α-methylpregnan-20-one (Blue tetrazolium test positive).

The crude 3α,21-diacetoxy-11β,17α-dihydroxy-16α-methylpregnan-20-one is dissolved in 50 ml. of methylene chloride and chromatographed on 500 g. of Florisil. The column is eluted with methylene chloride-acetone mixtures. From the methylene chloride-2% acetone eluate the 3α,21-diacetoxy-11β,17α-dihydroxy-16α-methylpregnan-20-one is obtained. Recrystallized from methanol the compound melted at 193.5–197.5° C. The authenticity of the product was determined by infra-red spectra and paper strip chromatogram. Yield 0.31 g. (1 fraction only).

*Preparation of 17α,21-dihydroxy-16α-methyl-4-pregnene-3,11,20-trione*

To a solution of 6 grams of crystalline N-bromo acetamide in 116 cc. of methanol, 1.8 cc. of pyridine and 6 cc. of water is added 7 grams of 3α,11β,17α,21-tetrahydroxy-16α-methylpregnan-20-one. The mixture is stirred for 16 hours at room temperature protected from light. At the end of this time, considerable crystallization has occurred and 2.1 cc. of allyl alcohol is added to discharge excess N-bromo-acetamide followed by 2.2 cc. of 6 N hydrochloric acid for neutralization of the pyridine. Crystallization is forced to completion by slow addition of 450 cc. of water. After aging the mixture in an ice bath for one hour, the crystalline product, 17α,21-dihydroxy-16α-methylpregnane-3,11-dione, is recovered by filtration, washed with water, and dried.

Five grams of 17α,21-dihydroxy-16α-methylpregnane-3,11-dione is mixed with 25.0 cc. of acetic anhydride and 1.6 cc. of pyridine is added as a catalyst. The mixture is stirred at 50° C. for three hours at which time the heating bath is replaced by a cooling bath. While carefully controlling the temperature at 45–50° C., 4.5 cc. of water is mixed with 9.5 cc. of glacial acetic acid and is added slowly to decompose excess acetic anhydride. After stirring the mixture for one hour at 40–45° C. to insure complete reaction, 250 mg. of zinc dust is added; vigorous stirring is continued for one hour at 40–45° C. to effect complete reduction of small amounts of unwanted bromo ketones. The excess zinc is removed by filtration after cooling to room temperature and the product, 17α,21-dihydroxy-16α-methylpregnane-3,11,20-trione 21-acetate was crystallized by careful addition of 150 cc. of water.

To 1 gram of 17α,21-dihydroxy-16α-methylpregnane-3,11,20-trione 21-acetate dissolved in 20 ml. of chloroform and 22.5 ml. of glacial acetic acid, at a temperature of −55° C., is added two drops of a 0.010 N solution of dry hydrogen bromide in glacial acetic acid. To about 3.80 ml. of 0.010 N hydrogen bromide in glacial acetic acid, at −55° C., is added 4.30 ml. of a solution containing 4 grams of bromine in chloroform, and the resulting solution is added, over about a 10-minute period, to the solution of the steroid, while maintaining the reaction mixture at about −55° C. The reaction mixture is allowed to stand at −55° C. for about one-half hour; a solution containing 25 grams of sodium acetate in 30 ml. of water is added, and the resulting mixture is stirred for about 5 minutes. Five milliliters of water are then added, and the aqueous mixture is extracted with ethyl acetate. The ethyl acetate extract is washed with aqueous sodium bicarbonate solution to neutrality, then with water, dried, and the solvent is evaporated in vacuo. The residual material is dissolved in 20 ml. of acetone, and to the solution is added 2.5 grams of sodium bromide and 1 ml. of water. The resulting mixture is heated under reflux for a period of about 5 hours, the reaction mixture is cooled, and the acetone is evaporated in vacuo. The residual material is extracted into ether, the ether extract is washed with water, dried, and the solvent is evaporated to a volume of about 10 ml.; petroleum ether is added to this solution, and the crystalline material which separates is recovered and dried to give approximately 4-bromo-17α,21-dihydroxy-16α-methylpregnane-3,11,20-trione 21-acetate.

A mixture of 4.8 grams of semicarbazide, 4.8 grams of 4-bromo-16α-methylpregnane-17α,21-diol-3,11,20-trione 21-acetate and 6.0 ml. of ethanol is heated under reflux in contact with a nitrogen atmosphere for a period of about three days, and the reaction solution is evaporated to a small volume, diluted with water and the crystalline material recovered and purified by recrystallization from aqueous methanol to give 17α,21-dihydroxy-16α-methyl-4-pregnene-3,11,20-trione-3,20-bis-semicarbazone 21-acetate.

Five grams of 17α,21-dihydroxy-16α-methyl-4-pregnene-3,11,20-trione-3,20-bis-semicarbazone 21-acetate is dissolved in a mixture of 10.0 cc. of benzene and 10.0 cc. of 11.0 N methanolic potassium hydroxide, and the solution is allowed to stand at room temperature for a period of about 10 minutes. The solution is then acidified with acetic acid, the benzene is evaporated in vacuo, and the residual material is recrystallized from ethyl acetate to give 17α,21-dihydroxy-16α-methyl-4-pregnene-3,11,20-trione-3,20-bis-semicarbazone.

A mixture of 6 grams of 17α,21-dihydroxy-16α-methyl-pregnene-3,11,20-trione-3,20,-bis-semicarbazone, 2.0 ml. of dimethylformamide, 6.0 ml. of chloroform, and 15.0 ml. of 10.0 N aqueous hydrochloric acid is heated under reflux for a period of about three hours. The resulting two-phase system is cooled to a temperature of approximately 15° C., and the layers are separated. The aqueous layer is extracted with chloroform, and the chloroform extracts are combined with the original chloroform-dimethylformamide solution. The combined organic layer is washed with an aqueous solution of sodium bicarbonate, and chloroform and dimethylformamide in the combined organic layer is replaced with ethyl acetate by evaporation in vacuo. Petroleum ether is added and the resulting solution is subjected to a partition chromatogram on diatomaceous earth using aqueous methanol as the stationary phase and benzene-chloroform as the moving phase to give 17α,21-dihydroxy-16α-methyl-4-pregnene-3,11,20-trione.

Various changes and modifications may be made in this invention, certain preferred embodiments of which are herein disclosed, without departing from the scope thereof; to the extent that these changes and modifications are within the scope of the appended claims, they are to be considered as part of this invention.

We claim:
1. 3α - acetoxy - 17α,21-dibromo-16α-methylpregnane-11,20-dione.
2. 3α - hydroxy - 16α - methyl - 11 - oxo-17(20)pregnen-21-oic acid.
3. Methyl 3α - hydroxy - 16α - methyl-11-oxo-17(20)-pregnen-21-oate.
4. A process which comprises reacting 3α-acetoxy-16α-methylpregnane-11,20-dione, with bromine to form 3α-acetoxy - 17α,21 - dibromo - 16α-methylpregnane-11,20-dione.
5. A process which comprises reacting 3α-hydroxy-16α-methyl-11-oxo-17(20)-pregnen-21-oic acid with diazomethane to form methyl 3α-hydroxyl-11-oxo-16α-methyl-17(20)-pregnen-21-oate.
6. The process which comprises reacting 3α-acetoxy-17α,21 - dibromo - 16α-methylpregnane-11,20-dione with alcoholic potassium hydroxide to form 3α-hydroxy-16α-methyl-11-oxo-17(20)-pregnen-21-oic acid.

References Cited in the file of this patent
UNITED STATES PATENTS

| | | |
|---|---|---|
| 2,752,366 | Hogg | June 26, 1956 |
| 2,769,824 | Schneider et al. | Nov. 6, 1956 |

OTHER REFERENCES

Archives of Bioch. and Biophys., article by Axelrod et al., vol. 60 (1956) pages 373–8.

Journal of American Chemical Society vol 77 (1955), article by Rosenkranz et al., page 2240 relied on.

Fieser: Natural Products Related to Phenanthrene, 1949, page 425.